(12) United States Patent
Rümler

(10) Patent No.: US 10,983,014 B2
(45) Date of Patent: Apr. 20, 2021

(54) METHOD FOR CALIBRATING A TEMPERATURE MEASURING DEVICE

(71) Applicant: SIKA Dr. Siebert & Kühn GmbH & Co. KG, Kaufungen (DE)

(72) Inventor: Klaus Rümler, Kassel (DE)

(73) Assignee: SIKA DR. SIEBERT & KÜHN GMBH & CO. KG, Kaufungen (DE)

( * ) Notice: Subject to any disclaimer, the term of this patent is extended or adjusted under 35 U.S.C. 154(b) by 0 days.

(21) Appl. No.: 16/549,091

(22) Filed: Aug. 23, 2019

(65) Prior Publication Data

US 2020/0072682 A1 Mar. 5, 2020

(30) Foreign Application Priority Data

Aug. 29, 2018 (DE) ................ 10 2018 121 051.5

(51) Int. Cl.
*G01K 15/00* (2006.01)
*G01K 7/42* (2006.01)
*G01K 7/02* (2021.01)

(52) U.S. Cl.
CPC ........... *G01K 15/005* (2013.01); *G01K 7/427* (2013.01); *G01K 7/02* (2013.01)

(58) Field of Classification Search
CPC ........ G01K 15/005; G01K 7/427; G01K 7/02; G01K 1/024
USPC .................................. 347/1, 17, 19
See application file for complete search history.

(56) References Cited

U.S. PATENT DOCUMENTS

| 5,857,777 | A | 1/1999 | Schuh | |
|---|---|---|---|---|
| 2003/0002562 | A1* | 1/2003 | Yerlikaya | G01K 15/00 374/208 |
| 2014/0269812 | A1* | 9/2014 | Deutscher | G01K 15/00 374/1 |
| 2015/0110147 | A1 | 4/2015 | Mizuno | |
| 2016/0320252 | A1* | 11/2016 | Ostermeyer | G01N 21/4133 |
| 2018/0120169 | A1* | 5/2018 | Jackson | H04L 63/0428 |

FOREIGN PATENT DOCUMENTS

| CN | 2457583 Y | 10/2001 |
|---|---|---|
| CN | 207528369 U | 6/2018 |
| DE | 602004008330 T2 | 5/2008 |
| DE | 102015106805 A1 | 11/2016 |
| EP | 2793008 A1 | 10/2014 |

OTHER PUBLICATIONS

Chinese Office Action dated Sep. 11, 2020; Chinese Application No. 201910648699.5.

* cited by examiner

*Primary Examiner* — Huan H Tran
*Assistant Examiner* — Alexander D Shenderov
(74) *Attorney, Agent, or Firm* — Dinsmore & Shohl LLP

(57) ABSTRACT

A method for calibrating a temperature measuring device having a temperature measuring unit and having at least one sensor connectable to the temperature measuring unit includes the steps of providing a temperature calibrator having a sensor mount into which the sensor is inserted and heated to a test temperature, inserting the at least one sensor into the sensor mount, setting up a communication channel for a data transmission between the temperature calibrator and the temperature measuring device, and transmitting a calibration value from the temperature calibrator to the temperature measuring device by means of the communication channel.

19 Claims, 3 Drawing Sheets

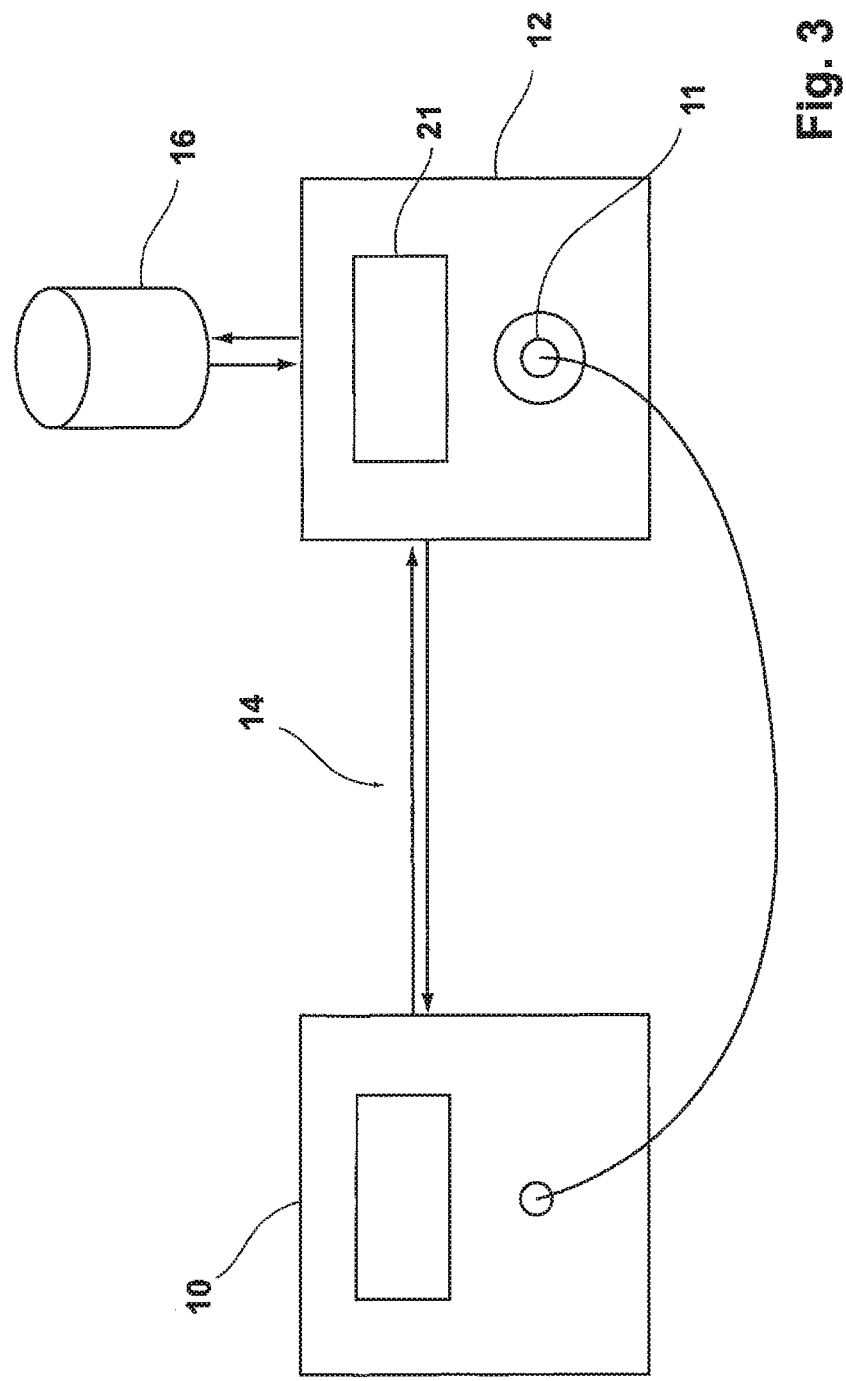

METHOD FOR CALIBRATING A TEMPERATURE MEASURING DEVICE

CROSS-REFERENCE TO RELATED APPLICATION

This application claims priority from German Application No. 10 2018 121 051.5 filed Aug. 29, 2018, the entire content of which is incorporated herein by reference.

FIELD OF THE INVENTION

The invention relates to a method for calibrating a temperature measuring device comprising a temperature measuring unit and at least one sensor connectable to the temperature measuring unit, wherein a temperature calibrator is provided having a sensor mount in which the sensor of the temperature measuring device is inserted and is heated to a test temperature.

BACKGROUND OF THE INVENTION

Temperature measuring devices are generally known having a temperature measuring unit and having a sensor that is connected to the temperature measuring unit by a sensor cable or via radio. If the sensor is used to measure a temperature, the latter can typically be displayed on a display means of the temperature measuring unit.

Conventional sensors are based on thermocouples, that are composed of a pair of metallic conductors of different materials that are connected to one another at one end and the temperature measurement takes place while utilizing the so-called thermoelectric effect. Resistance thermometers are also in use in which the electrical resistance varies over the temperature, with further measuring elements also being able to be used as part of the present invention.

The measuring sensors are here typically encased in a sensor housing and the determination and output of the measured temperature value takes place via the temperature measuring unit. A temperature measuring device in the present sense comprises a temperature measuring unit and one or more sensors that are each connected to the temperature measuring unit by sensor cables or also wirelessly.

Deviations can result in the detection of measured temperature values over a longer period of use due to aging effects so that temperature measuring devices have to regularly calibrated, in particular when they are used in a technical environment in which a very exact temperature determination is required. Temperature calibrators serve the calibration of such temperature measuring devices and the sensors can be placed in sensor mounts of such temperature calibrators and the sensors are heated to a verified temperature via a heating means of the temperature calibrator so that finally a comparison can take place with this set temperature of the temperature calibrator between the temperature output by the temperature measuring unit and the calibration temperature of the temperature calibrator.

Such a temperature calibrator is known, for example, from EP 2 793 008 A1. The sensor mount is introduced in a calibration sleeve that can be heated to the calibration temperature by a heating device. The temperature calibrator here indicates the current, in particular highly accurate, tested, and thus verified calibration temperature via a corresponding display means.

After a measurement of the deviation between the set temperature of the temperature calibrator and the displayed temperature on the temperature measuring unit of the temperature measuring device has taken place, a deviation can be determined that is ultimately used for a readjustment of the temperature measuring unit or the deviation is excluded by calculation for future measurements with the temperature measuring device.

Such calibrations of temperature measuring devices using temperature calibrators are time-intensive and the sensor has to be removed from the actual application and inserted into the sensor mount over a longer calibration time period. An additional effort to correspondingly adjust the temperature measuring device or to exclude the value of the temperature deviation in future temperature measurements by calculation furthermore results due to the later use of the determined deviation of the temperature measurement. The demand results from this to improve the temperature calibration, in particular in connection with the temperature measuring device and with the use of the calibration value later determined.

SUMMARY OF THE INVENTION

The object of the invention is the improvement of a method for calibrating a temperature measuring device by means of a temperature calibrator. In this process, the calibration value should be used in an advantageous and in particular time-saving manner.

To further develop the method, the invention makes provision that a communication channel is set up for data transmission between the temperature calibrator and the temperature measuring device and that a transmission of a calibration value from the temperature calibrator to the temperature measuring device takes place by means of the communication channel.

The central idea of the invention is the setting up of communication between the temperature measuring device, that is either between the temperature measuring unit or the sensor, and the temperature calibrator. The setting up of a communication channel here enables the transmission of the calibration value from the temperature calibrator to the temperature measuring device so that, for example, the determined calibration value is stored in the temperature measuring unit and can be taken into account for the future temperature display. The transmitted calibration value can be associated with a specific sensor here. If the temperature measuring device is put back into operation after the calibration, the output of the measured temperature for each sensor can already be displayed in a manner configured in an automated fashion.

In the sense of the invention, the communication channel can be set up either wirelessly or in a wired manner. It is conceivable in this process to connect the temperature measuring unit to the temperature calibrator via a data cable; however, it is in particular advantageous if the communication channel is configured in a wireless manner, for example by means of near field communication (NFC).

In accordance with the invention, as part of the calibration, before the insertion of the sensor into the sensor mount, an actual temperature value can first be transmitted from the temperature measuring device to the temperature calibrator by means of the communication channel. A data transmission via the communication channel is thus possible both from the temperature calibrator to the temperature measuring device and from the temperature measuring device to the temperature calibrator. The actual temperature value can, for example be stored in the temperature calibrator so that the temperature difference that is shown in the calibration value can already be determined by the temperature calibrator and can be transmitted to the temperature measuring device. The requirement for this is in particular the setting of a calibration temperature that is similar or equal to the predominant measured temperature of the sensor of the temperature measuring device that is used.

It is also conceivable that the calibration value is detected and processed by a processor of the temperature measuring unit for the calibration of the temperature measurement after the transmission of the calibration value from the temperature calibrator to the temperature measuring device. The detection and processing of the calibration value takes place electronically here and advantageously in particular without the intervention of an operator.

It is furthermore possible that a temperature control value of a subsequent measurement is transmitted from the temperature measuring unit to the temperature calibrator after the detection and processing of the calibration value by the processor of the temperature measuring unit. The temperature control value can also be stored in the temperature calibrator and can thus be documented.

A data memory can be present for data storage and can in particular be integrated in the temperature calibrator, with at least the calibration value for the calibrated sensor or, in association, for every calibrated sensor being stored in the data memory. A determination can thus be made over a longer time period and in particular over a plurality of calibration processes whether a sensor is already subject to aging and a decision can be made to, for example, replace a sensor. The temperature calibrator can here have a display means on which the calibration history of each sensor to be calibrated can be displayed. If, for example, the calibration values produce increasing temperature differences that become considerably larger between the calibrated temperature and the temperature output by the temperature measuring unit, a decision can accordingly be made whether a sensor has to be replaced or not.

This analysis can in particular also take place in an automated manner so that an analysis of calibration values is carried out with consecutive calibrations of a sensor by means of the temperature calibrator so that an aging profile is prepared for the sensor or, in association, for every calibrated sensor. This aging profile can in particular be displayed on a display means of the temperature calibrator.

The data transmission between the temperature calibrator and the temperature measuring unit can take place both to the temperature measuring unit or also to the sensor. The sensor can have a data module for this purpose, for example in or connected to a plug by which the sensor is connected to the temperature measuring unit by the sensor cable. The data module is here associated with the sensor itself and if the temperature calibrator transmits the calibration value to the data module, the sensor can be used in conjunction with the data module as a sensor that has already been calibrated again without the temperature measuring unit itself receiving, detecting, and processing the calibration value. The data module can also be arranged in the sensor head itself, but the sensor may accordingly not be used for temperatures that are too high since the data module can otherwise be damaged. It is therefore advantageous to configure the data module, for example, in a constructive unit with a plug of the sensor by which the sensor is connected to the temperature measuring unit.

The sensor further advantageously has an ID carrier that can be read optically or by means of an electromagnetic signal, with the ID carrier of the sensor being read by the temperature calibrator before the calibration. The ID carrier is, for example, configured as an RFID tag and an ID reading unit that automatically recognizes the sensor is present in or connected to the temperature calibrator. In this connection, the aging profile and thus the calibration history of the specific sensor can, for example, be uploaded from the data memory and displayed.

To carry out the method in accordance with the invention, the temperature calibrator has a communication module by which the communication channel to the temperature measuring device is set up and by which an analysis of determined calibration values can be carried out. The communication module can here also be configured in a constructive unit with a control unit for operating the temperature calibrator.

The invention is further directed to a temperature calibrator for carrying out the method in accordance with the invention, for which purpose the temperature calibrator has, in accordance with the invention, a communication module by which the communication channel to the temperature measuring device can be set up and by which an analysis of determined calibration values can be carried out. The temperature calibrator further advantageously has a data memory for storing sensor data. The temperature calibrator in particular has a display means by which the sensor data, in particular comprising the aging profile and the calibration history of the specific sensor, can be displayed. The identification of the recognized sensor can in particular also first be displayed via the display means of the temperature calibrator so that an operator receives feedback that the correct sensor can also be recognized and be associated with the associated aging profile.

The functions of the calibration and of the adjustment and the check of the sensor or of the measuring device can further advantageously be carried out in a completely automated manner. The test and setting parameters for the carrying out of the method can in particular be stored in and readable from the ID carrier of the sensor so that the calibration, adjustment, and checking of the sensor and/or of the temperature measuring unit can be carried out without the necessity of new inputs of these parameters.

The data stored in the ID carrier can, for example, comprise test temperatures that are to be moved to by the temperature calibrator or the data include the temperature range in which the sensor may be used. The data can also include the typical temperature range of the application in which then the test points should be closer or can include permitted measurement deviations of the sensor to be able to decide whether a new adjustment is necessary at all with small measurement deviations or whether the sensor has to be considered defective with very large measurement deviations. The kind of linearization or the characteristic can also be stored in the data.

BRIEF DESCRIPTION OF THE DRAWINGS

Further measures improving the invention will be shown in more detail below together with the description of a preferred embodiment of the invention with reference to the Figures. There are shown:

FIG. 3 is a schematic view of a temperature measuring device and a temperature calibrator with a data store.

DETAILED DESCRIPTION OF THE INVENTION

Figure 1:
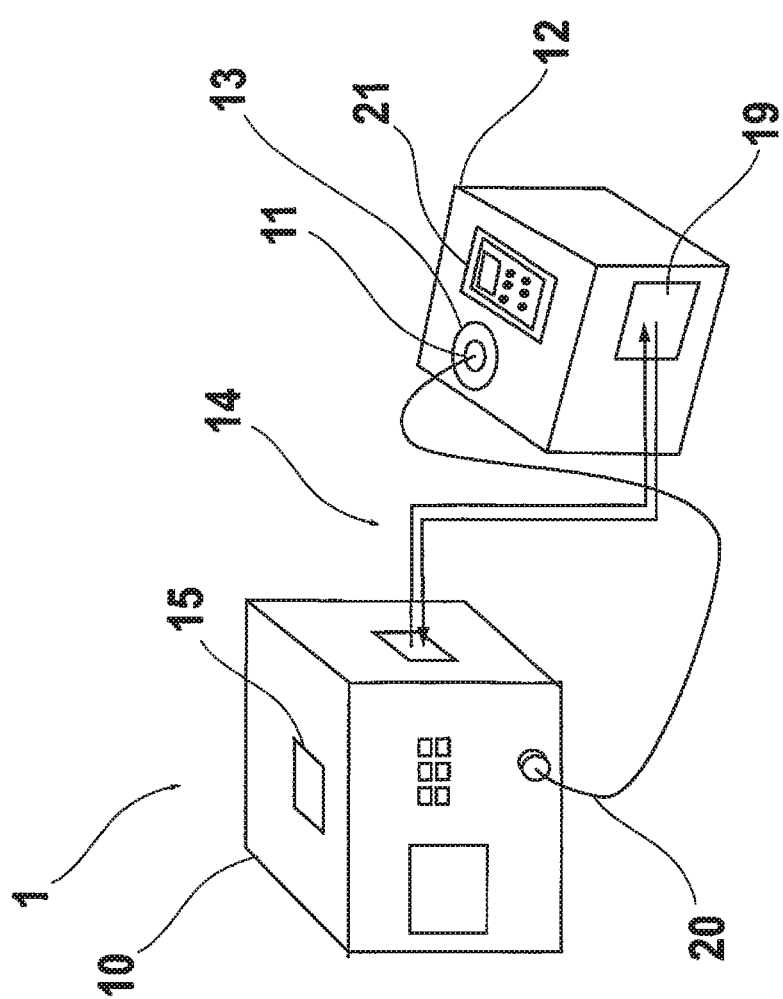
FIG. 1 is a schematic view of a temperature measuring device in communication with a temperature calibrator in accordance with the invention.

FIG. 1 shows in a schematic view a temperature measuring device 1 having a temperature measuring unit 10 and having a sensor 11, and the sensor 11 is connected to the temperature measuring unit 10 by a sensor cable 20. A temperature calibrator 12 is further shown having a sensor mount 13 in which the sensor 11 for calibration is inserted. The temperature measuring unit 10 is shown in a schematically represented manner with a processor 15 and the temperature calibrator 12 is configured with a control panel 21.

In accordance with the invention, a communication channel 14 is set up between the temperature measuring device 1 and the temperature calibrator 12 and calibration values can be transmitted, for example, from the temperature calibrator 12 to the temperature measuring device 1 via the communication channel 14. The transmission here takes place to the temperature measuring unit 10, but can however, also take place in a manner not shown in any more detail, for example, directly to the sensor 11.

To set up the communication channel 14 between the temperature measuring device 1 and the temperature calibrator 12, the temperature calibrator 12 has a communication module 19 that is, for example, configured as a wireless interface, in particular on the basis of near field communication, for example Bluetooth or wireless LAN.

Data can be transmitted to the temperature calibrator 12 both from the temperature measuring device 1, in particular from the temperature measuring unit 10, via the communication channel 14; for example, an actual temperature value before the actual calibration and/or a temperature control value after the conclusion of the calibration. The communication channel 14 here predominantly serves the transmission of a calibration value from the temperature calibrator 12 to the temperature measuring unit 10.

Figure 2:
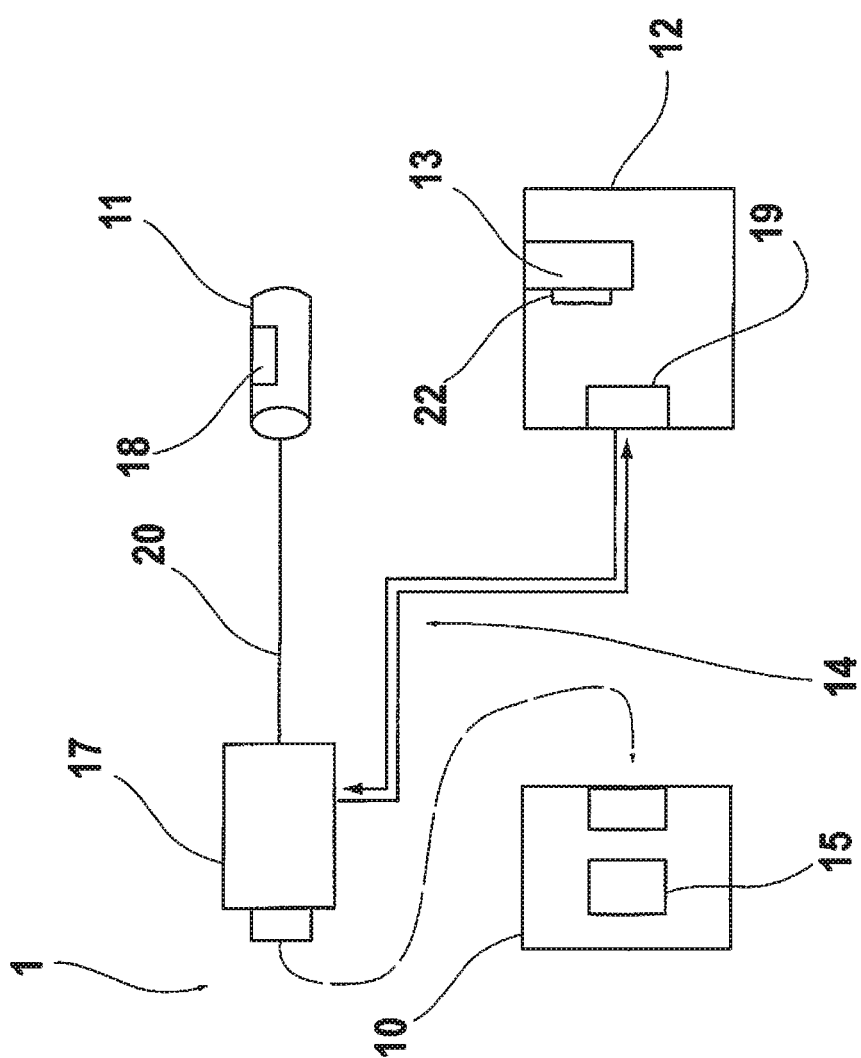
FIG. 2 is a schematic view of a temperature measuring device with a sensor and with an ID carrier in an arrangement on the sensor and with a data module that is configured in communication with the sensor.

FIG. 2 shows the temperature measuring device 1 in a schematic design with the temperature measuring unit 1 comprising the processor 15; and the sensor 11 with the sensor cable 20 is shown separately from the temperature measuring unit 10. A data module 17 that is configured as a plug contact means that can be plugged into a corresponding device at the temperature measuring unit 10 is located at the end of the sensor cable 20 disposed opposite the sensor 11. The illustration shows a communication channel 14 between the temperature calibrator 12 with the communication module 19 and with the data module 17; and the communication channel 14 can be configured as wireless, for example. The same applies to the embodiment in which the processor 15 is already integrated in the sensor 11.

The sensor 11 furthermore has an ID carrier 18 and if the sensor 11 is introduced into the sensor mount 13, an ID reading unit 22 can read the ID carrier 18, for example if the ID carrier 18 is configured as an RFID tag. The temperature calibrator 12 can thus determine the identity of the sensor 11 and the calibration value transmitted to the temperature measuring device 1 by the communication channel 14 can be specifically associated with the sensor 11.

FIG. 3 shows a further schematic view of the temperature measuring unit 10 having the sensor 11 in an arrangement in the temperature calibrator 12 and a communication channel 14 is set up between the temperature measuring unit 10 and the temperature calibrator 12. A data memory 16 is further-more separately shown that can also be configured in a constructive unit with the temperature calibrator 12; the data memory 16 can in particular be integrated in the housing of the temperature calibrator 12. The data memory 16 can particularly advantageously serve to store specific data of the sensors 11 and if a calibration of a sensor 11 takes place, the calibration history of the specific sensor 11 can be read out of the data memory 16 and can, for example, be displayed via a control panel 21 of the temperature calibrator 12.

The invention is not restricted in its execution to the preferred embodiment provided above. A number of variants is rather conceivable that also makes use of the solution shown with generally differently designed embodiments. All the features and/or advantages, including any construction details or spatial arrangements, originating from the claims, the description or the drawings can be essential to the invention both per se and in the most varied combinations.

REFERENCE NUMERAL LIST 1 temperature measuring device
10 temperature measuring unit
11 sensor
12 temperature calibrator
13 sensor mount
14 communication channel
15 processor
16 data memory
17 data module
18 ID carrier
19 communication module
20 sensor cable
21 control panel
22 ID reading unit

The invention claimed is:

1. A method for calibrating a temperature measuring device including a temperature measuring unit and at least one sensor connectable to the temperature measuring unit, the method comprising the steps of:
   providing a temperature calibrator having a sensor mount into which the sensor is inserted and heated to a test temperature, wherein a data memory is present and/or is integrated in the temperature calibrator, the data memory having prior calibration values in association with a plurality of calibrated sensors stored therein, a calibration value being based on a difference between the test temperature and a temperature output of the temperature measuring device;
   inserting the at least one sensor into the sensor mount;
   automatically setting up a communication channel for a data transmission between the temperature calibrator and the temperature measuring device;
   identifying the sensor from among the plurality of calibrated sensors for which prior calibration values associated therewith are stored in the data memory;
   automatically transmitting the calibration value from the temperature calibrator to the temperature measuring device by means of the communication channel;
   automatically checking and adjusting, thereby calibrating, the sensor or the measuring unit based on the calibration value; and
   automatically storing at least the calibration value for the calibrated sensor in the data memory.

2. A method in accordance with claim 1, further comprising detecting and processing the calibration value by a processor of the temperature measuring unit or by a data module of the at least one sensor for an adjustment of the temperature measurement after the transmission of the calibration value from the temperature calibrator to the temperature measuring device.

3. A method in accordance with claim 2, further comprising transmitting a temperature control value of a subsequent measurement from the temperature measuring unit to the temperature calibrator after the detection and processing of the calibration value by the processor of the temperature measuring unit or by the data module of the at least one sensor.

4. A method in accordance with claim 1, wherein the communication channel is configured as wireless and the data transmission between the temperature calibrator and the temperature measuring device or the data module of the sensor is carried out via near field communication.

5. A method in accordance with claim 1, wherein an analysis of calibration values is carried out with consecutive calibrations of the at least one sensor by means of the temperature calibrator so that an aging profile is prepared for the sensor or, in association, for every calibrated sensor.

6. A method in accordance with claim 1, wherein the data transmission is carried out between the temperature calibrator and the temperature measuring unit, the sensor, or a data module of the sensor of the temperature measuring device.

7. A method in accordance with claim 1, wherein the sensor has an ID carrier readable optically or by means of an electromagnetic signal, with the ID carrier of the sensor being read by the temperature calibrator before the calibration.

8. A method in accordance with claim 1, wherein the temperature calibrator has a communication module by which the communication channel to the temperature measuring device or to the sensor is set up and by which an analysis of determined calibration values is carried out.

9. A temperature calibrator for carrying out a method in accordance with claim 1, wherein the temperature calibrator has a communication module by which the communication channel to the temperature measuring device can be set up and by which an analysis of determined calibration values can be carried out.

10. A temperature calibrator in accordance with claim 9, wherein the temperature calibrator has a data memory for storing sensor data.

11. A temperature calibrator in accordance with claim 9, wherein the test and setting parameters for the carrying out of the method are stored in and are readable from the ID carrier of the sensor so that the calibration, adjustment, and checking of the sensor and/or of the temperature measuring unit can be carried out without necessity of new inputs of these parameters.

12. A method according to claim 1, wherein the at least one sensor is separate from the temperature measuring unit and connected to the temperature measuring unit by a wired connection or wirelessly.

13. A method for calibrating a temperature measuring device including a temperature measuring unit and at least one sensor connectable to the temperature measuring unit, the method comprising the steps of:
providing a temperature calibrator having a sensor mount into which the sensor is inserted and heated to a test temperature;
transmitting an actual temperature value from the temperature measuring device to the temperature calibrator by means of the communication channel before inserting the sensor into the sensor mount;
inserting the at least one sensor into the sensor mount
setting up a communication channel for a data transmission between the temperature calibrator and the temperature measuring device;
transmitting a calibration value from the temperature calibrator to the temperature measuring device by means of the communication channel.

14. A method for calibrating a temperature measuring device including a temperature measuring unit and at least one sensor having an ID and connectable to the temperature measuring unit, the method comprising the steps of:
providing a temperature calibrator having a sensor mount into which the sensor is inserted and a data memory integrated in the temperature calibrator;
heating the temperature calibrator to a test temperature;
inserting the at least one sensor into the sensor mount;
automatically by the temperature calibrator, setting up a communication channel for a data transmission between the temperature calibrator and the temperature measuring device;
automatically by the temperature calibrator, reading and identifying the ID of the sensor;
automatically transmitting a temperature measurement from the temperature measuring device to the temperature calibrator;
automatically by the temperature calibrator, determining and transmitting a calibration value based on the temperature measurement and the test temperature from the temperature calibrator to the temperature measuring device by means of the communication channel;
automatically by the temperature measuring device, detecting and processing the calibration value; and
storing the calibration value for the sensor in the data memory thereby defining an aging profile corresponding to the ID of the sensor.

15. A method according to claim 14, wherein the at least one sensor is separate from the temperature measuring unit and connected to the temperature measuring unit by a wired connection or wirelessly.

16. A method according to claim 14, further comprising:
automatically calling the set of aging profile corresponding to the ID of the sensor from the data memory to a display; and
determining based on the set of aging profile whether the sensor needs to be replaced.

17. A method according to claim 14, further comprising:
after detecting and processing the calibration value, automatically transmitting a temperature control value of temperature measurement from the temperature measuring device to the temperature calibrator; and
storing and documenting the temperature control value in the calibrator.

18. A method according to claim 14, wherein the data transmission between the temperature calibrator and the temperature measuring device is to the temperature measuring unit or to the sensor.

19. A method according to claim 14, wherein the sensor comprises a data module, the method further comprising:
transmitting the calibration value to the data module from the temperature calibrator;
calibrating the sensor without receiving, detecting, and processing the calibration value at the temperature measuring unit.

* * * * *